(12) United States Patent
Achtermann et al.

(10) Patent No.: US 6,704,782 B1
(45) Date of Patent: Mar. 9, 2004

(54) SYSTEM AND METHODS FOR REAL TIME PROGRESS MONITORING IN A COMPUTER NETWORK

(75) Inventors: Jeffrey Mark Achtermann, Austin, TX (US); Alberto Giammaria, Austin, TX (US); John Conrad Sanchez, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,269

(22) Filed: Dec. 9, 1999

(51) Int. Cl.⁷ .............................................. G06F 15/173
(52) U.S. Cl. ....................................... 709/224; 709/223
(58) Field of Search ................................ 709/220, 221, 709/222, 223, 224; 370/252, 254

(56) References Cited

U.S. PATENT DOCUMENTS

| | | | |
|---|---|---|---|
| 4,523,206 A | 6/1985 | Sasscer | 364/200 |
| 4,697,266 A | 9/1987 | Finley | 371/12 |

(List continued on next page.)

FOREIGN PATENT DOCUMENTS

| | | |
|---|---|---|
| EP | 0 192 120 | 8/1986 |
| EP | 0 711 088 | 5/1996 |
| EP | 0 871 123 | 10/1998 |
| IE | 66464 | 4/1994 |
| JP | 7-50673 | 2/1995 |
| JP | 9-331323 | 12/1997 |
| JP | 10-303890 | 11/1998 |
| SU | 1741145 A2 | 6/1992 |
| WO | WO 97/15018 | 4/1997 |
| WO | WO 97/38624 | 10/1997 |

OTHER PUBLICATIONS

"Error Handler Activation Procedure," *IBM Technical Disclosure Bulletin*, vol. 37 No. 08, Aug. 1994, pp. 231–232.
"Transferring Bulk Data in Message Queueing System," *IBM Technical Disclosure Bulletin*, vol. 41 No. 01, Jan. 1998, pp. 437–438.
"Execution Time Dynamic Data Collection at First Detection of Failure," *IBM Technical Disclosure Bulletin*, vol. 37 No. 06B, Jun. 1994, pp. 391–392.
"Variable Paged Array' Datatype," *IBM Technical Disclosure Bulletin*, vol. 37 No. 07, Jul. 1994, pp. 89–92.
"Distributing a Document Using a Regional Reference," *IBM Technical Disclosure Bulletin*, vol. 33 No. 3A, Aug. 1990, p. 251.
"Using Data Link Control–Level Feedback to Control Application Buffer Usage and Packet Loss," *IBM Technical Disclosure Bulletin*, vol. 41 No. 01, Jan. 1998, pp. 199–204.

(List continued on next page.)

*Primary Examiner*—Rupal Dharia
*Assistant Examiner*—Nguyen Quang
(74) *Attorney, Agent, or Firm*—Barry S. Newberger; Winstead Sechrest & Minick P.C.; Leslie A. Van Leeuwen

(57) ABSTRACT

A method of monitoring data distribution progress in a computer network including a Distribution Manager and an end-user terminal communicating with the Distribution Manager through at least one node in the network. The Distribution Manager generates an identifier associated with the distribution along with a routing to the end-user terminal through the network. The Distribution Manager updates a Distribution State Table, maintaining information describing the progress of the distribution, and a Node State Table, maintaining information describing the status of the node in the network. The distribution data is then sent to the end-user terminal via the selected routing. Data are collected at the node from the end-user terminal describing the status of the end-user terminal and those data are transferred to the Distribution Manager. The Distribution Manager updates the distribution State and Node State Tables with the data received from the Node.

23 Claims, 9 Drawing Sheets

U.S. PATENT DOCUMENTS

| | | | |
|---|---|---|---|
| 5,367,643 A | 11/1994 | Chang et al. ............... | 395/325 |
| 5,446,874 A | 8/1995 | Waclawsky et al. ......... | 395/575 |
| 5,448,230 A | 9/1995 | Schanker et al. ...... | 340/870.03 |
| 5,455,934 A | 10/1995 | Holland et al. ............. | 395/404 |
| 5,457,683 A | 10/1995 | Robins ......................... | 370/60 |
| 5,542,047 A * | 7/1996 | Armstrong ................... | 709/224 |
| 5,566,306 A | 10/1996 | Ishida ......................... | 395/309 |
| 5,572,678 A | 11/1996 | Homma et al. ........ | 395/200.12 |
| 5,586,256 A | 12/1996 | Thiel et al. ............ | 395/200.03 |
| 5,590,124 A | 12/1996 | Robins ......................... | 370/258 |
| 5,680,602 A | 10/1997 | Bloem et al. ............... | 395/601 |
| 5,701,482 A | 12/1997 | Harrison et al. ............ | 395/675 |
| 5,724,516 A | 3/1998 | Temoshenko .......... | 395/200.32 |
| 5,745,783 A | 4/1998 | Suzuki et al. ............... | 395/825 |
| 5,754,763 A | 5/1998 | Bereiter ................. | 395/187.01 |
| 5,778,224 A * | 7/1998 | Tobe et al. .................. | 709/105 |
| 5,781,735 A * | 7/1998 | Southard ..................... | 709/223 |
| 5,799,323 A | 8/1998 | Mosher, Jr. et al. ........ | 707/202 |
| 5,805,920 A | 9/1998 | Sprenkle et al. ............ | 395/821 |
| 5,819,083 A | 10/1998 | Chen et al. .................. | 395/610 |
| 5,842,212 A | 11/1998 | Ballurio et al. ............. | 707/100 |
| 5,905,868 A * | 5/1999 | Baghai et al. ............... | 709/224 |
| 5,964,839 A * | 10/1999 | Johnson et al. ............. | 709/224 |
| 5,978,845 A * | 11/1999 | Reisacher ................... | 709/223 |
| 6,070,190 A * | 5/2000 | Reps et al. .................. | 709/224 |
| 6,108,782 A * | 8/2000 | Fletcher et al. ............. | 709/224 |
| 6,118,783 A * | 9/2000 | Kunito | |
| 6,141,785 A * | 10/2000 | Hur et al. | |
| 6,175,874 B1 * | 1/2001 | Imai et al. | |
| 6,415,333 B1 * | 7/2002 | Vasell ......................... | 709/313 |
| 6,434,115 B1 * | 8/2002 | Schwartz et al. | |

OTHER PUBLICATIONS

"Dynamic Determination of Network Topology," *IBM Technical Disclosure Bulletin*, vol. 38 No. 03, Mar. 1995, pp. 411–418.

"Pointer Collection and Reporting for Error Recovery Procedures Branching," *IBM Technical Disclosure Bulletin*, vol. 39 No. 07, Jul. 1996, pp. 87–90.

"Hybrid Switch Control Scheme for Fast Point–to–Point/ Multicast/Hunt–Group Connection Setup," *IBM Technical Disclosure Bulletin*, vol. 37 No. 11, Nov. 1994, pp. 641–646.

"Flow Control of Prioritized Data in a Multimedia Communications System," *IBM Technical Disclosure Bulletin*, vol. 37 No. 01, Jan. 1994, pp. 531–532.

"Distributed Object Encapsulation of Customer Information Control System Distributed Transaction Processing," *IBM Technical Disclosure Bulletin*, vol. 38 No. 01, Jan. 1995, pp. 177–180.

"Reconciliation of Shadowed Mail Items with Master," *IBM Technical Disclosure Bulletin*, vol. 33 No. 6B, Nov. 1990, pp. 120–121.

"Riadata—An Automated Retain Incident Analysis Facility," *IBM Technical Disclosure Bulletin*, vol. 34 No. 10A, Mar. 1992, pp. 278–283.

Cao G. et al., "Low–cost Checkpointing with Mutable Checkpoints in Mobile Computing Systems," International Conference on Distributed Computing Systems, 18th, Amsterdam, May 26–29, 1998, Proceedings, pp. 464–471.

Wiener, J.L. et al., "OODB Bulk Loading Revisited: the Partitioned–list Approach," International Conference on Very Large Data Bases, 21st, Zurich, Sep. 11–15, 1995, Proceedings of VLDB '95, pp. 30–41.

Muntz, D.A. et al., "Evaluating Delayed Write in a Multi–level Caching File System," IFIP/IEEE International Conference on Distributed Platforms, [Dresden, Feb. 27–Mar. 1, 1996], Proceedings: Client/Server and Beyond, pp. 415–429.

Jakoby, A. et al., "Data Transmission in Processor Networks," International Workshop on Distributed Algorithms, 9th, Proceedings of WDAG '95, pp. 145–159.

Joshi, A. et al., "On Disconnected Browsing of Distributed Information," International Workshop on Research Issues in Data Engineering, 7th, Birmingham, UK, Apr. 7–8, 1997, Proceedings: High Performance Database Management for Large–scale Applications, pp. 101–107.

Saglietti, F., "Dynamic Decision on Checkpointing by Use of Reduced Ordered Binary Decision Diagrams," International Conference on Computer Safety, Reliability and Security, 16th, York, UK, Sep. 7–10, 1997, [Proceedings of ] SAFECOMP '97.

* cited by examiner

SYSTEM AND METHODS FOR REAL TIME PROGRESS MONITORING IN A COMPUTER NETWORK

CROSS-REFERENCE TO RELATED APPLICATIONS

Related subject matter may be found in the following commonly assigned, co-pending U.S. patent applications, both of which are hereby incorporated by reference herein:

Ser. No. 09/460,855 (AT9-99-275), entitled "APPARATUS FOR DATA DEPOTING AND METHOD THEREFOR";

Ser. No. 09/460,853 (AT9-99-276), entitled "APPARATUS FOR RELIABLY RESTARTING INTERRUPTED DATA TRANSFER AT LAST SUCCESSFUL TRANSFER POINT AND METHOD THEREFOR";

Ser. No. 09/438,436 (AT9-99-655), entitled "APPARATUS FOR CONNECTION MANAGEMENT AND METHOD THEREFOR";

Ser. No. 09/458,268 (AT9-99-324), entitled "COMPUTER NETWORK CONTROL SYSTEMS AND METHODS";

Ser. No. 09/460,852 (AT9-99-325), entitled "METHODS OF DISTRIBUTING DATA IN A COMPUTER NETWORK AND SYSTEMS USING THE SAME";

Ser. No. 09/458,269 (AT9-99-315), entitled "SYSTEMS AND METHODS FOR REAL TIME PROGRESS MONITORING IN A COMPUTER NETWORK; and Ser. No. 09/460,851 (AT9-99-316), entitled "APPARATUS FOR AUTOMATICALLY GENERATING RESTORE PROCESS DURING SOFTWARE DEPLOYMENT AND METHOD THEREFOR".

TECHNICAL FIELD

The present invention relates generally to data processing systems, and in particular, to systems and methods for real time progress monitoring in a computer network.

BACKGROUND INFORMATION

Network distribution of software products has become one of the most important means by which a software vendor can efficiently and conveniently support its customers. Notwithstanding, these procedures take time, which often results in frustration and impatience on the part of the receiving customers. For example, a distribution of a large software package (i.e., greater than 100 megabytes) to a large number of end user machines (i.e., greater than a 1000) can take many hours if not days. During this time, the end users are often left wondering about the status of the download. In addition, a distribution can encounter a variety of errors and similar anomalies, including unavailable target machines on the network, failed installation on various end user machines, and network outages. In these cases, both the distributing entity and the end users have a vested interest in monitoring the distribution progress.

Currently available software distribution methods provide little, if any, feedback to the end users with regards to the progress and status of the download process. Often the end users are presented with a simple hourglass icon on their computer screens which indicates that the process has been initiated, but provides little information as to when the distribution might finish or if any errors have been encountered. It is not until the distribution is finally finished, that the end user is provided with a dialog box indicating that either the download has been successful or that an error has occurred at some point during the process. The actual source of any errors may or may not be clearly identified. Moreover, once a distribution has been initiated, it cannot be canceled, unless the downloading server is restarted by specific invocation of a command line. When this happens, the states of each node in the network can be left in an indeterminate state.

In sum, the need has arisen for systems and methods which reduce the level of frustration often experienced by end users patiently awaiting the receipt of a software distribution. Among other things, these systems and methods should allow the end users to monitor the progress to get a reasonable idea of when the distribution might finish as well as advising those end users of any errors which have occurred which are affecting the download process.

SUMMARY OF THE INVENTION

The principles of the present invention are embodied in methods of monitoring data distribution progress in computer networks, as well as the computer networks themselves. According to these principles, a method of monitoring data distribution progress is disclosed for a computer network including a Distribution Manager and an end-user terminal communicating with the Distribution Manager through at least one node in the network. The Distribution Manager generates an identifier associated with the distribution and a routing to the end-user terminal through the network. A Distribution State Table maintaining information describing the progress of the distribution is updated by the Distribution Manager along with a Node State Table maintaining information describing a status of the Node in the network. The distribution data is transmitted to the end-user via the selected routing. Data describing the status of the end-user terminal is collected from the end-user terminal at the Repeater and then transmitted to the Distribution Manager. The Distribution Manager updates the Distribution State and Node State Tables with the data received from the Node.

The present invented principals are also embodied in a computer network which includes a server for running a Distribution Manager for controlling operations in an associated database. A source repeater is coupled to the server and operates in response to an application program, the application program initiating a data distribution. The network includes a plurality of target machines for receiving data during a distribution and generating status information in response. A gateway repeater is coupled to the plurality of target machines and collects status information generated by the target machines and transmits that status information to the Distribution Manager for storage in the corresponding tables within the database. The status data is transmitted to the Distribution Manager via at least one other repeater in the network. A user interface allows user access to data stored within the tables within the interface.

The principles of the present invention provides substantial advantages over the prior art. Among other things, it allows a system administrator, or even an authorized endpoint user, to monitor the status of a data distribution being made across a computer network for a multiplicity of targets. The ability to monitor the status of the distribution allows for an estimation of the time required to complete the distribution as well as a means for detecting anomalies occurring during the distribution. For example, the ability to monitor allows the monitoring party to determine if a given endpoint is unavailable or has failed to successfully download the data being distributed.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
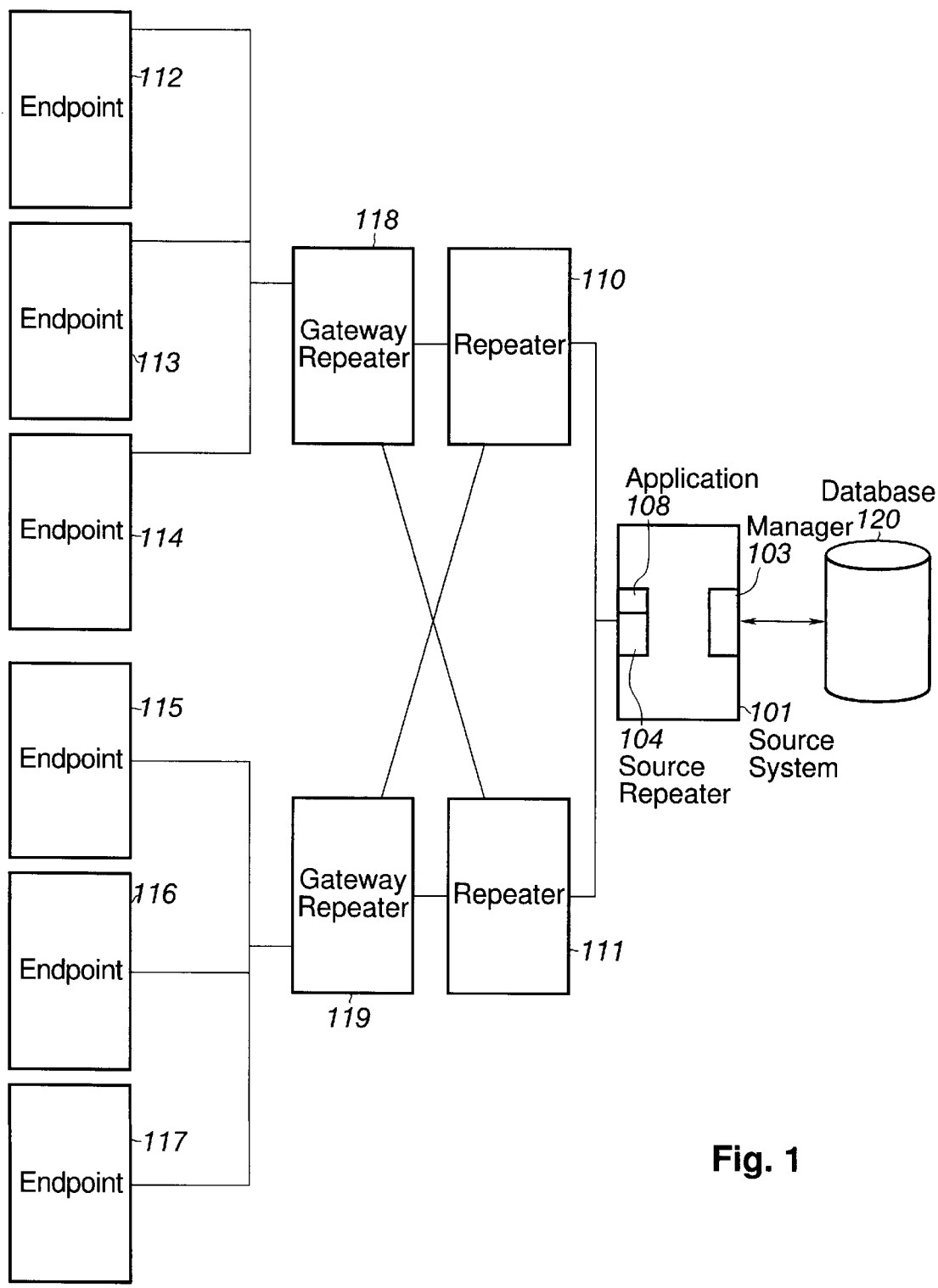
FIG. 1 is a high level diagram of an exemplary computer networking system suitable for practicing the principles of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. Referring to the drawings, depicted elements are not necessarily shown to scale, and like or similar elements are designated by the same reference numeral through the several views.

FIG. 1 is a high level functional block diagram of a computer network 100 suitable for practicing the principles of the present invention. It should be noted that network 100 is for illustrative purposes and that in actual applications of the principles of the present invention, network 100 may include a larger or even much larger number of network nodes and corresponding cross-connections.

Network 100 is based upon a server 101 operating in conjunction with a database 120. For purposes of the present discussion, server 101 maintains the distribution manager software system ("distribution manager") which provides overall status monitoring for the bulk transfer of data throughout network 100, and manages database 120.

The network system 100 includes source system 101, one or more fan-out or, repeaters 110, 111, 118, 119, and a plurality of endpoints 112–117 (which may also be referred to as target machines or, simply, targets). Additionally, certain repeaters, such as 118 and 119, are directly connected to one or more endpoints, in the exemplary embodiment of FIG. 1, endpoints 112–114 or 115–117, respectively, and may be referred to as "gateway" repeaters (or, simply, "gateways").

Source system 101 provides distribution services with respect to resources 112–117. Note that source system 101 and endpoints 112–117 interface to repeaters 110 and 111 using the same methodologies as repeaters 110 and 111 interface with, for example, repeaters 118 and 119. Viewed logically, source system 101 may include a source repeater 104 which includes application 108 constituting the software to be distributed. In other words, as an artisan of ordinary skill would recognize, as used herein, a repeater may be a logical element, that may be, but is not necessarily associated with a physical stand-alone hardware device in network 100. Repeater 110 may be the primary repeater through which resources 112–114 receive their data transfers, and repeater 111, likewise, may primarily service endpoints 115–117. It would be understood by an artisan of ordinary skill that additional repeaters may be inserted into the network and may be arranged in a multi-level hierarchy according to the demands imposed by the network size.

Gateway repeaters 118 and 119 are such repeaters in the exemplary embodiment of FIG. 1.

However, network system 100 may provide cross connections in order to provide redundant, parallel communication paths should the primary communication path to the endpoint become unavailable. For example, in FIG. 1, endpoint 114 has a primary pathway to source system 101 through repeaters 118 and 110. (A source system, such as source system 101 may also be referred to as a source node.) Should repeater 110 become unavailable, source system 101 can transfer bulk data to endpoint 114 via an alternative pathway through repeaters 118 and 111. Additionally, should repeater 118 become unavailable, endpoint 114 may receive data via repeaters 111 and 119.

A graphics user interface (GUI) 107 is provided, as discussed further below, to allow the system user or administrator monitoring of data distributions across the network. Graphics user interface 107 is effectuated, for example, by a workstation or PC similar to that illustrated in FIG. 2. Data distributions may be initiated by graphical users interfaces and/or applications programs 108a–l running at any of the endpoints 112–117.

Figure 2:
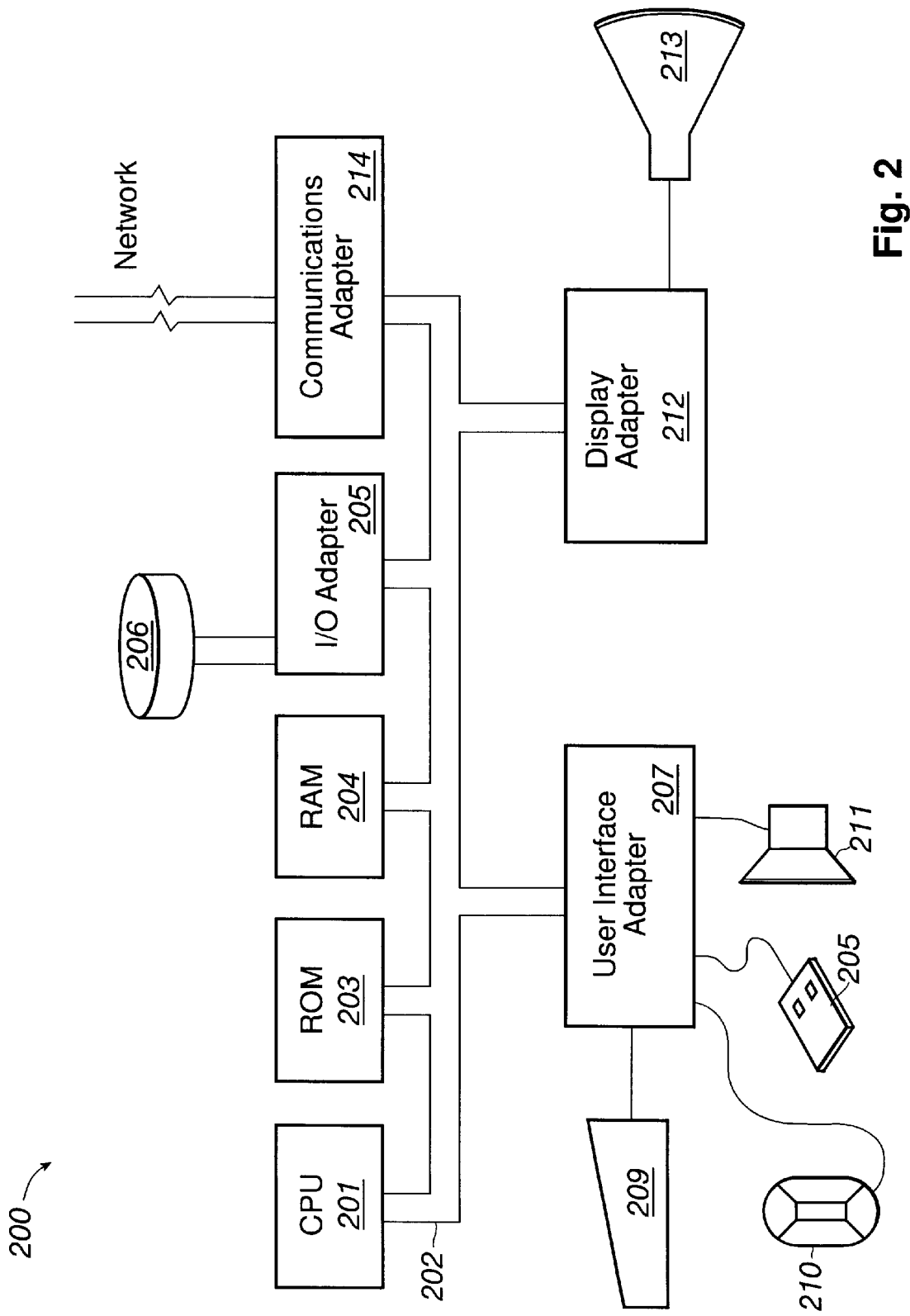
FIG. 2 is a more detailed functional block diagram of a processing system suitable for use in one or more of the processing nodes of the system in FIG. 1.

FIG. 2 is a high level functional block diagram of a representative data processing system 200 suitable for practicing the principles of the present invention. System 200 is an example of endpoint 106, and also may be used to implement server 101 and various repeaters throughout system 100. Processing system 200, includes a central processing system (CPU) 201 operating in conjunction with a system bus 202. CPU 201 may be for example, a reduced instruction set computer (RISC), such as an IBM POWER Processor, or a complex instruction set computer (CISC). System bus 202 operates in accordance with a standard bus protocol, such as the ISA protocol, compatible with CPU 201.

CPU 201 operates in conjunction read-only memory (ROM) 203 and random access memory (RAM) 204. Among other things, ROM 16 supports the basic input output system (BIOS). RAM 204 includes for example, DRAM (Dynamic Random Access Memory) system memory and SRAM (Static Random Access Memory) external cache.

I/O Adapter 205 allows for an interconnection between the devices on system bus 202 and external peripherals, such as mass storage devices (e.g., a hard drive, floppy drive or CD/ROM drive), or a printer. A peripheral device 206 is for example, coupled to a peripheral control interface (PCI) bus, and I/O adapter 205 therefore may be, for example, a PCI bus bridge.

User interface adapter 207 couples various user input devices, such as keyboard 208, mouse 209, touchpad 210 or speaker 211 to the processing devices on bus 202.

Display adapter 212 supports a display 213 which may be for example a cathode ray tube (CRT), liquid crystal display (LCD) or similar conventional display unit. Display adapter 212 may include among other things a conventional display controller and frame buffer memory.

System 200 can be selectively coupled to a computer or telecommunications network through communications adapter 214. Communications adapter 214 may include for example, a modem for connection to a telecommunications network and/or hardware and software for connecting to a computer network such as a local area network (LAN) or wide area network (WAN).

Figure 3A:
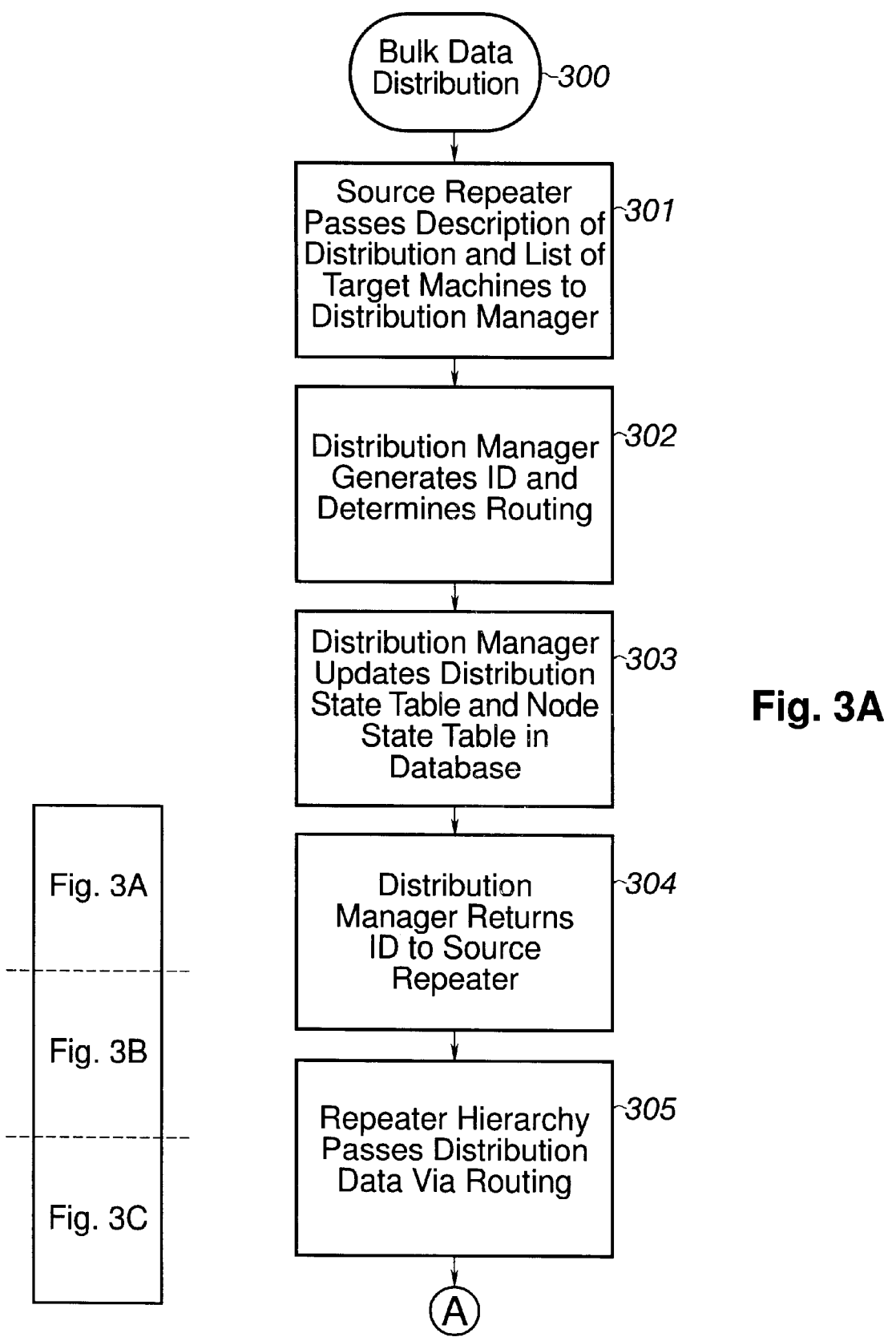
FIG. 3 is a flow diagram illustrating a bulk data distribution procedure embodying the principles of the present invention.
Figure 3B:
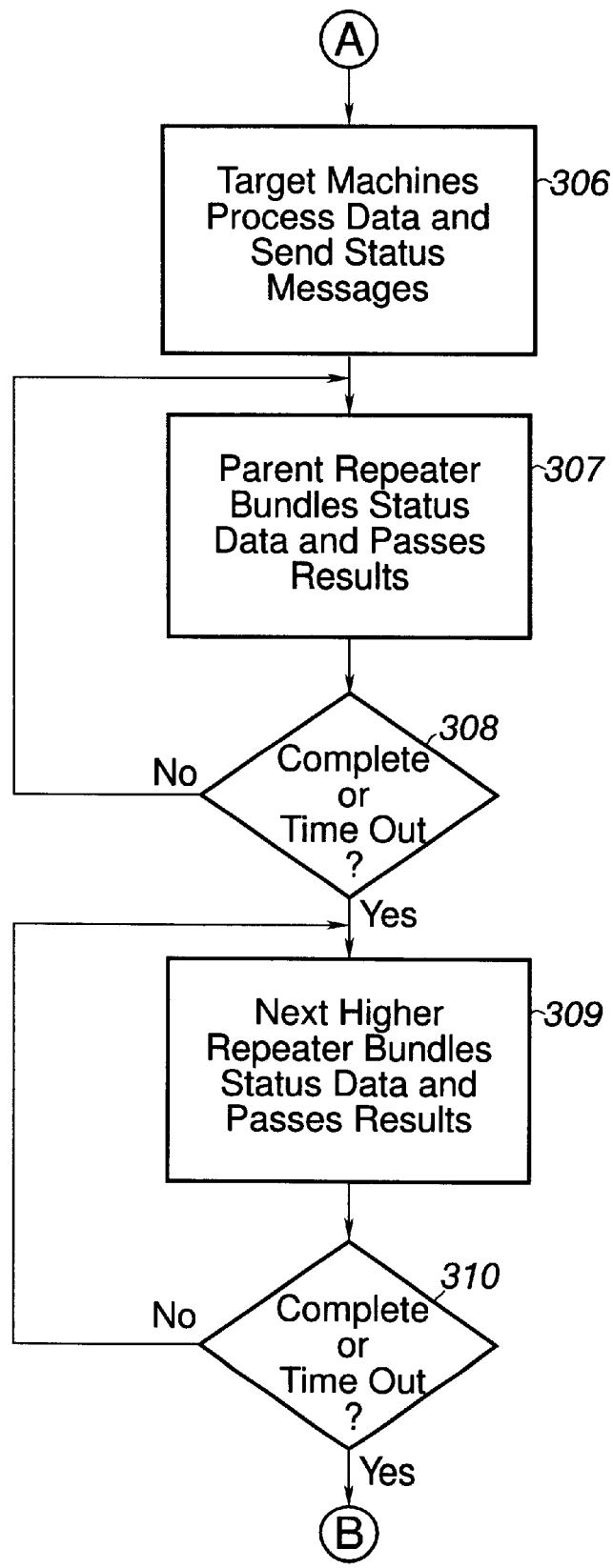
Figure 3C:
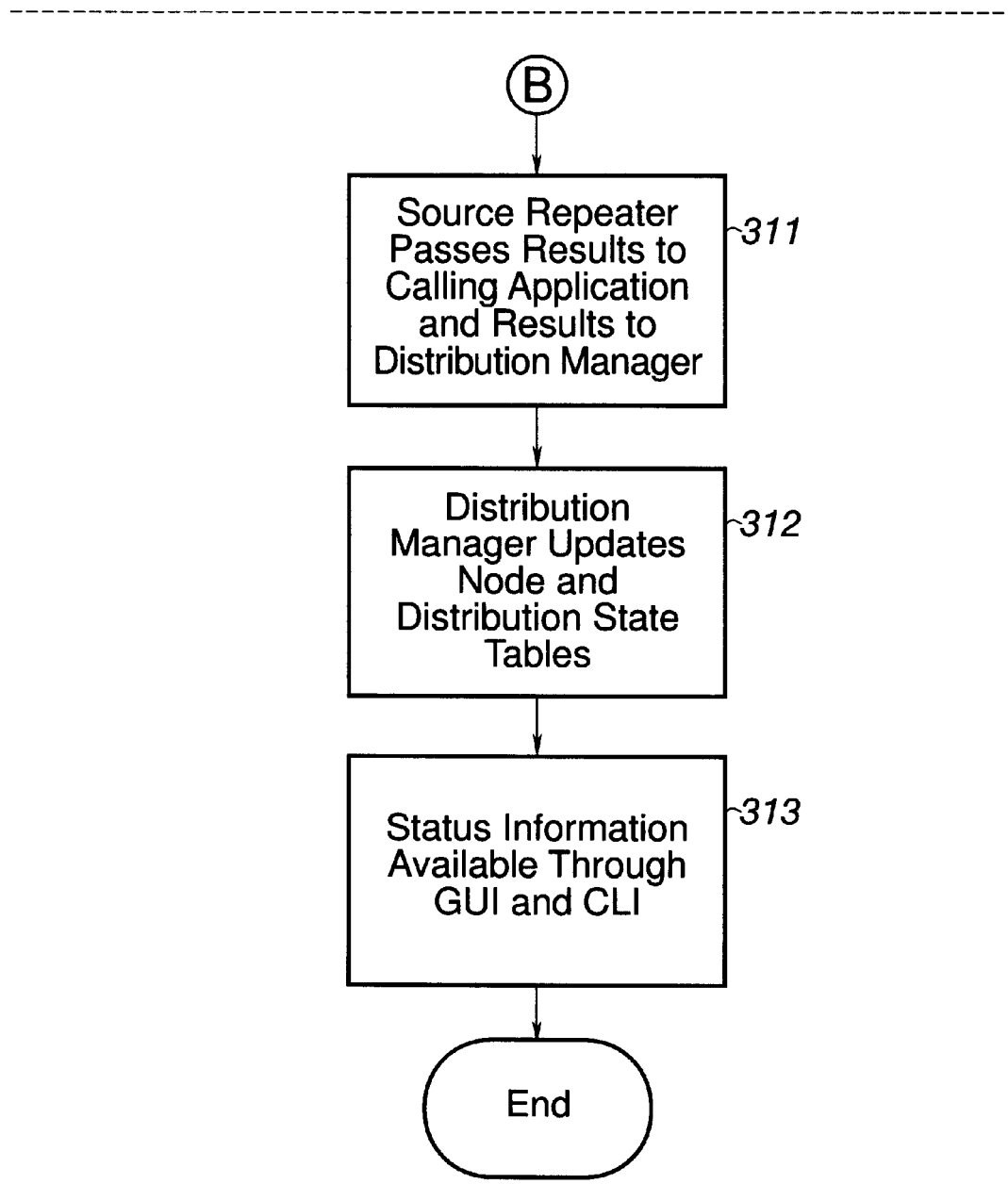

FIG. 3 is a flow diagram illustrating a bulk data distribution monitoring procedure 300 embodying the principles of the present invention. The application running on a given source repeater 104 in system 100 initiates the procedure by prompting the distribution manager to register the distribution. Specifically, at Step 301, the selected source repeater 104 passes a description of the data to be distributed along with a list of endpoints 112–117 to the distribution manager at Step 301. The distribution manager then, at Step 302, generates a unique ID identifying the distribution transaction and determines a routing to the endpoints 112–117 through the hierarchy of repeaters. As noted above, the distribution manager has available to it a multiplicity of redundant paths which allows it to optimize performance. For example, the distribution manager could select the communications links which have the best available bandwidth at the time.

At Step 303 the distribution manager creates and updates a Distribution State Table and Node State Table, in database 102 and associated with the distribution transaction by the unique ID. In the preferred embodiment, the distribution manager creates an entry in the Distribution State Table such as shown in TABLE 1 and an entry in the Node State Table such as shown in TABLE 2. In the preferred embodiment, the Distribution Table is arranged in a number of rows and columns, with each distribution assigned a row and the corresponding columns representing the data fields for that distribution. As can be seen from TABLE 1, a given entry in the Distribution State Table identifies the distribution by its ID, and the source repeater, and maintains corresponding timing parameters describing the progress of the transaction. With regards to the Node State Table, a row (entry) is created for each node involved in the distribution, including all repeaters and targets. Each node is identified by a unique node ID. The columns (fields) are associated with the distribution through the use of the distribution ID. Each Node State Table entry maintains information concerning the state of the corresponding node, and in particular, information tracking the performance of the node with respect to selected timing parameters.

The distribution manager sends the unique distribution ID to the source repeater at Step 304. Then, at Step 305, the data being distributed (i.e., the distribution data) is passed from the given source repeater 104 through the repeater hierarchy via the route defined by the Distribution Manager. The distribution process continues at Step 306 until all of the endpoints 112–117 have received the distribution data. During this time, each repeater maintains information for each of the corresponding targets, such as that provide din TABLE 3. A method and apparatus for checkpoint restarts which may be used in conjunction with the associated data in TABLE 3 is described in the commonly owned, co-pending U.S. Patent Application entitled "Apparatus for Restarting Interrupted Data Transfer and Method Therefor" (Ser. No. 09/460,853) incorporated herein by reference.

The statistics of TABLE 3 for a given end-point can be used to make the following calculations, which can be returned to the Distribution Manager for updating the database:

transfer speed=number of bytes downloaded/(current time–time download started)

time remaining=(distribution size–byte offset)/transfer speed download time=time download finished–contact time; and total install time=time application finished–contact time.

Endpoint operations are typically ongoing through the distribution transaction. Possible states of a given endpoint, such as one of endpoints 112–117 are shown in TABLE 4. As can be seen, the downloading process to a given target processor can be successful, can fail, be rejected or halt due to a lack of memory space. The target processor may also be performing other tasks and therefore be unavailable. The downloading process can also be canceled, paused or interrupted by a user or application (via a GUI or command line interface). Moreover, the distribution lifetime may elapse and the operation simply expire. In particular, any time a target processor enters or leaves a pause, unavailable state, or interrupted state, a message, such as that shown in TABLE 5, is sent through the network to the Distribution Manager such that the Distribution and Node State Tables can be updated. However, in an embodiment of the present invention, this messaging may be disabled by the system administrator, to reduce network traffic.

Each endpoint 112–117 generates a message on its final status, including for example, the information listed in TABLE 6. The various exceptions which may be thrown and reported in the message are given in TABLE 7. This information (i.e., successful, failed, available, etc.) is returned to the parent (gateway) repeaters 118 and 119 associated with the given one of endpoints 112–117. At Step 307, each of these parent repeaters 105 collects and bundles the status information received from the corresponding one of endpoints 112–117. Repeaters 118 and 119 continue to do this until either a specified time interval has elapsed or all of the endpoints 112–117 associated with that repeater 105, and receiving the distribution data, have reported back (Step 308). The process then repeats itself at Step 309 where the next higher repeaters collect and bundle the status information received from the gateway repeaters 118 and 119. Specifically, each level collects and bundles the status information from the next lower level of repeaters, until then information is received by the server 101 (Step 311). The distribution manager application running on server 101 then updates the distribution state and mode state tables in the database at Step 312. As a result, at Step 313, the status information is available to the system users through a graphics user interface (GUI), command line program or custom SQL query.

In the case of successful transactions at the endpoint 106 level, the results of the processing, if any, of the distributed data are returned to the calling application 106. Preferably, these results are stored in the database by the Distribution Manager. It should be noted that final status data and results can be returned through the same route taken by the data distribution, but that this is not a requirement.

FIGS. 5a–5d are illustrations of exemplary GUI window display which are preferably used to allow the system high level administrators and/or end users access to information regarding the data distribution. The upper half of these windows display the global status of the current distribution. The tree view on the left provides a filter for the display of distributions with certain properties while the view on the right side shows the global status of the distribution wherein each row represents an active or completed distribution and the columns show data from the Distribution State Table from the database.

Figure 5A:
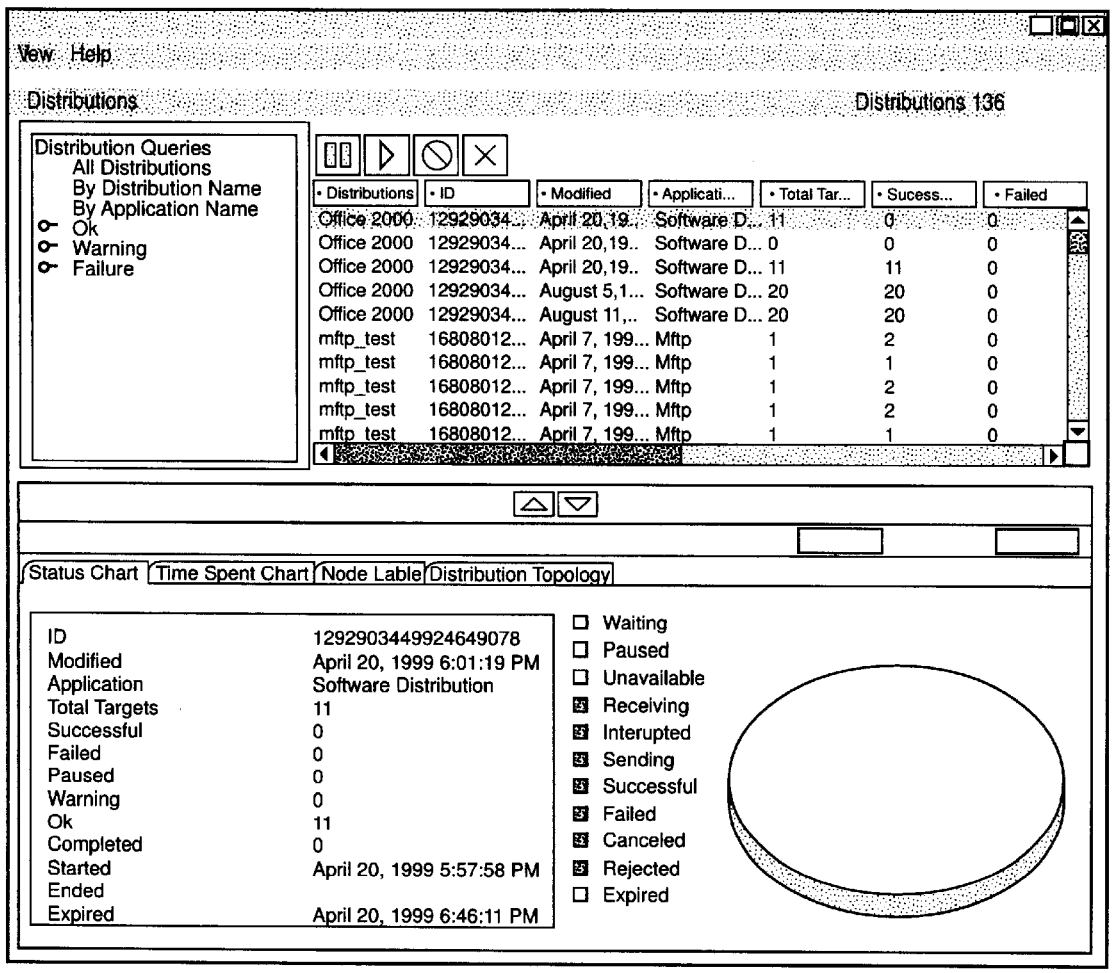
FIG. 5a provides a status chart pie graph representing the number of targets in each state.
Figure 5B:
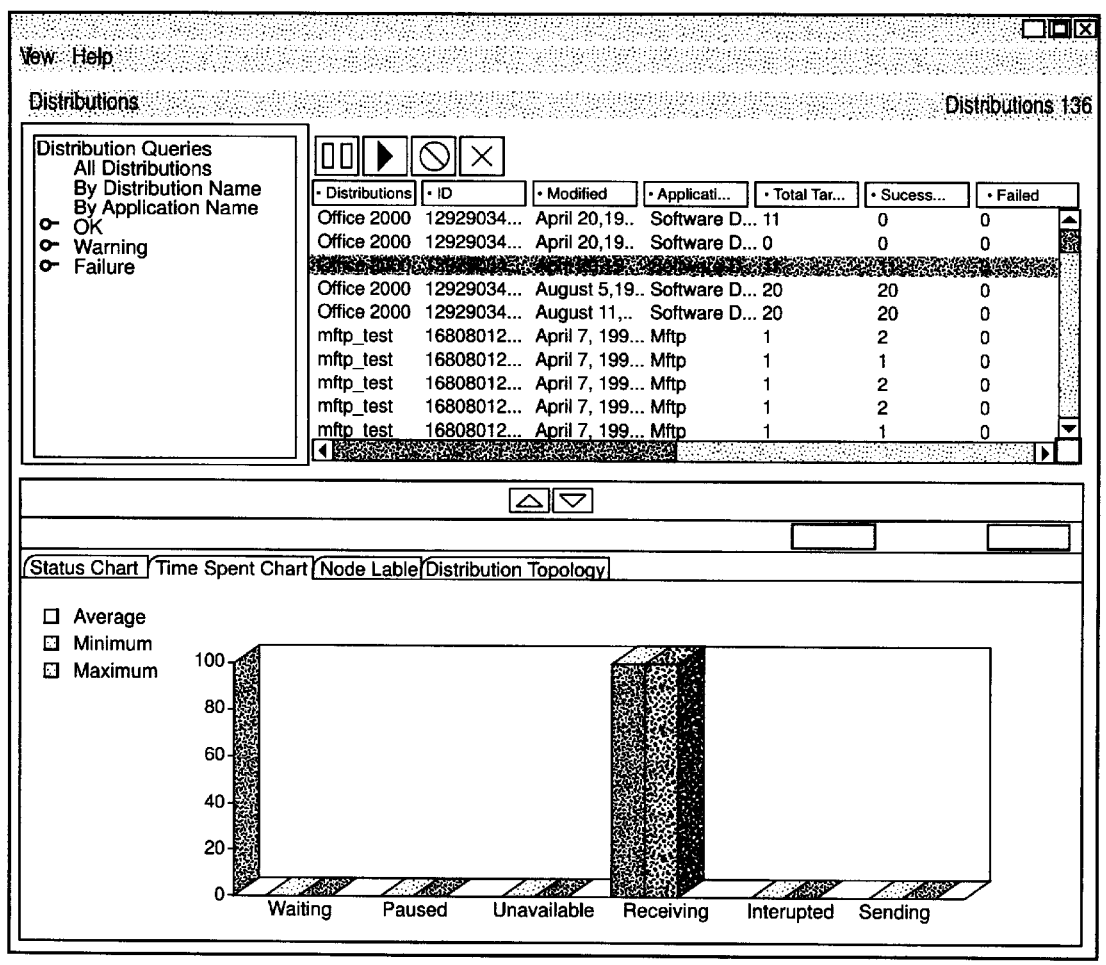
FIG. 5b illustrates a time spent chart which is a histogram displaying the minimum, average, and maximum time spent by the targets in each state.
Figure 5C:
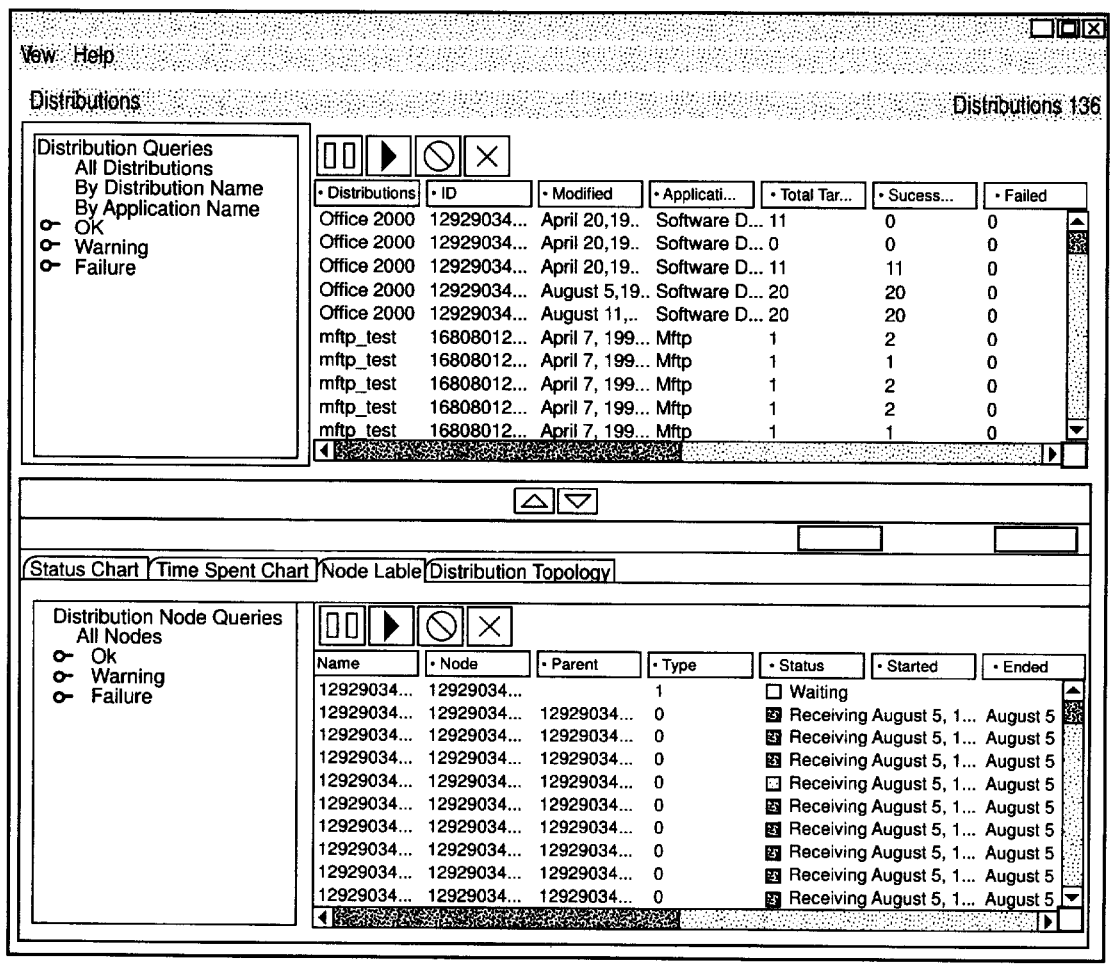
FIG. 5c illustrates a display of the information from the Node State Table from the database.
Figure 5D:
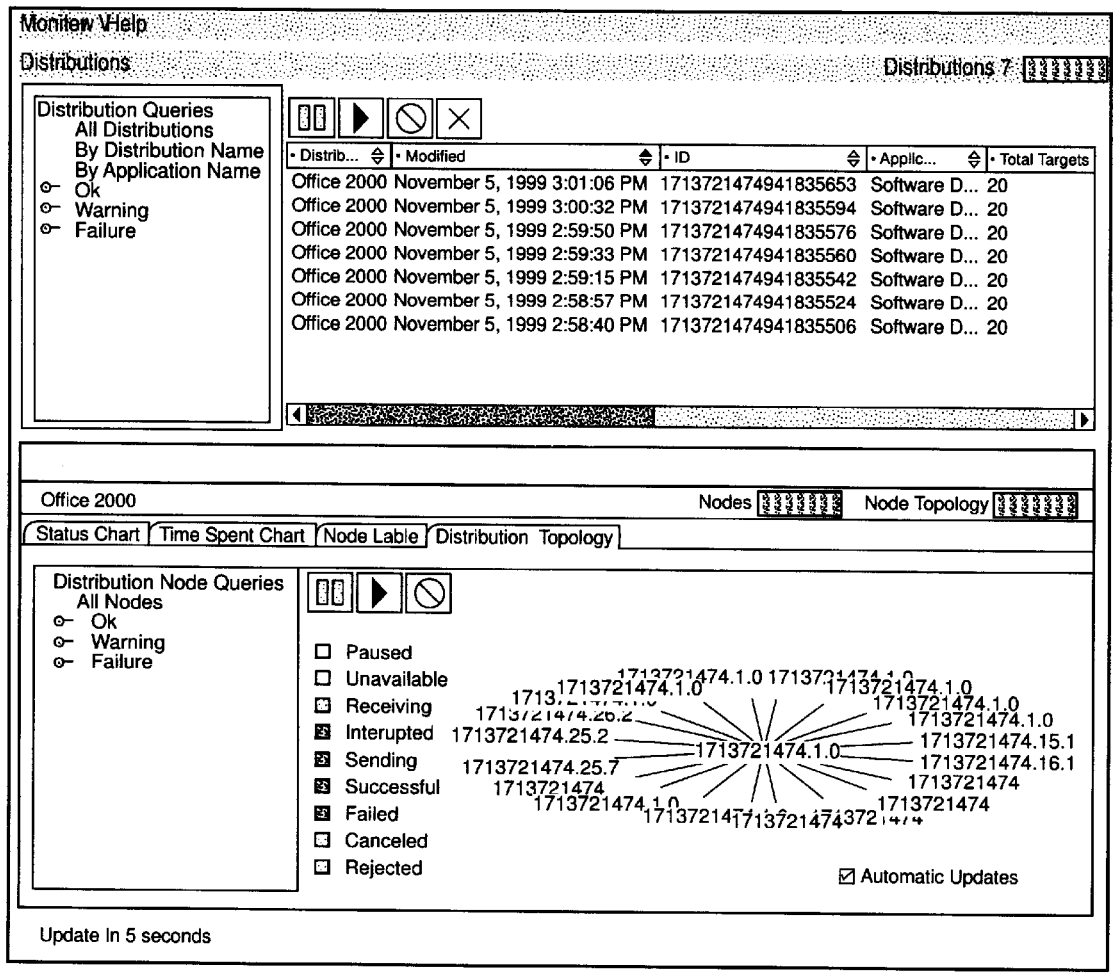
FIG. 5d illustrates a graphical display of a distribution topology.

The bottom half of the GUI windows show various ways of displaying specific information. For example, in FIG. 5a, a status chart is provided as a pie graph representing the number of targets in each state. In FIG. 5b, a time spent chart is shown which is a histogram displaying the minimum, average, and maximum time spent by the targets in each state. A display of the information from the Node State Table from the database is shown in FIG. 5c. It is also noted that a distribution topology, which would be a graphical view displaying the hierarchy of the repeaters and targets and the state of each node could also be displayed in the lower window of the GUI. Such an exemplary graphical display of the distribution topology is shown in FIG. 5d.

Although the present invention and its advantages have been described in detail, it should be understood that various changes, substitutions and alterations can be made herein without departing from the spirit and scope of the invention as defined by the appended claims.

TABLE 1

Distribution State Table

| Field Column Name | Description |
| --- | --- |
| Distribution ID | Unique distribution ID. |
| Owner | User ID of user starting distribution. |
| Label | Description of distribution for viewing by user. |
| Size | The Size of the distribution. |
| Source Application | Name of applications that started distribution. |
| Source Node | ID of source repeater. |
| Start Time | Time distribution started. |
| Finish Time | Time last status received. |
| Expire Time | Time at which distribution expires. |
| Last Update Time | Time database was last altered. |
| Last Operation | Last user operation (cancel, pause, resume). |
| Target Count | Number of targets. |
| Completed Count | Number of targets that have completed. |
| Waiting Count | Number of targets in specified state. |
| Paused Count | |
| Unavailable Count | |
| Receiving Count | |
| Interrupted Count | |
| Sending Count | |
| Successful Count | |
| Failed Count | |
| Canceled Count | |
| Rejected Count | |
| Expired Count | |
| Waiting Report | Number of endpoints reporting times in a specified state. These are used to calculate the average time in each state (Average Time = Total time/ Report). |
| Paused Report | |
| Unavailable Report | |
| Receiving Report | |
| Interrupted Report | |
| Sending Report | |
| Successful Report | |
| Failed Report | |

TABLE 1-continued

Distribution State Table

| Field Column Name | Description |
| --- | --- |
| Canceled Report | |
| Rejected Report | |
| Expired Report | |
| Min Waiting Time | Minimum time reported for this state. |
| Min Paused Time | |
| Min Unavailable Time | |
| Min Receiving Time | |
| Min Interrupted Time | |
| Min Sending Time | |
| Max Waiting Time | Maximum time in this state. |
| Max Paused Time | |
| Max Unavailable Time | |
| Max Receiving Time | |
| Max Interrupted Time | |
| Max Sending Time | |
| Total Waiting Time | Total Time in this state. |
| Total Paused Time | |
| Total Unavailable Time | |
| Total Receiving Time | |
| Total Interrupted Time | |
| Total Sending Time | |

TABLE 2

Node State Table

| Column Name | Description |
| --- | --- |
| Distribution ID | Unique distribution ID. |
| Node ID | ID of node (both repeaters and target endpoints are stored). |
| Parent Node ID | Parent node ID stored so that distribution path can be recreated. |
| Current State | State of endpoint. |
| Previous State | Previous endpoint state. |
| Start Time | Time distribution started to endpoint. |
| Finish Time | Time distribution finished to endpoint. |
| Last Update Time | Last time status updated. |
| Interruption Count | Number of times distribution was interrupted. |
| Unavailable Count | Number of time target was unavailable. |
| Receiving Time | Time spent sending data to endpoint. |
| Interrupted Time | Time spent in interrupted state. |
| Sending Time | Time spent spending data. |

TABLE 3

Repeater Endpoint Information

| Information | Description |
| --- | --- |
| Endpoint State | The current state of the endpoint (see table). |
| Contact Time | Time at which the endpoint method was called for the first time. |
| Start Time | Time at which the current instance of the endpoint method was invoked. If a distribution is interrupt. Contact Time. |
| Number of Restarts | Number of Time distribution has been restarted due to pauses, interruptions, etc. |
| Byte Offset | Current position within the distribution of the download. |
| Bytes Downloaded | Bytes downloaded during the current session (during this invocation of the endpoint method. This will be same as Byte Offset, unless checkpoint restart found a partial download on the target. In this case, Byte Offset - Bytes Downloaded will be checkpoint restart offset. |
| Last Write | Last time data was written to the client. |
| Download Finished | Time at which the download completed. |
| Application Finished | Time at which the application returned. |
| Information | Description |

TABLE 3-continued

Repeater Endpoint Information

| Information | Description |
| --- | --- |
| Total Interrupted Time | Total time spent in an interrupted (Paused, Interrupted, and Unavailable) state. |

TABLE 4

Target States

| State Type Message | Type Description |
| --- | --- |
| Waiting (Intermediate Event) | Destination is waiting to receive the distribution. |
| Downloading (Intermediate Event) | Distribution is being downloaded to the endpoint. |
| Processing (Intermediate Event) | All of the distribution's data has been received by the endpoint and is being processed. |
| Successful (Final Event and Result) | Distribution has completed successfully. |
| Distribution Error (Final Event and Result) | An error has occurred while transferring data to the endpoint. |
| Application Error (Final Event and Result) | The application processing the distribution encountered an error. |
| No Space (Final Event and Result) | Insufficient disk space on endpoint to hold and process distribution. |
| Interrupted (Intermediate or Final Event) | Distribution was interrupted for a recoverable error; it will be resumed. |
| Unavailable (Intermediate or Final Event) | Distribution was interrupted because the endpoint was unavailable. The distribution will be re-attempted when the endpoint logs back into its LCF Gateway. Will fail when lifespan has been reached. |
| Paused (Intermediate Event) | Distribution was paused. |
| Canceled (Final Event and Result) | Distribution was canceled. |
| Rejected (Final Event and Result) | Distribution was rejected by the end user. |
| Expired (Final Event and Result) | Distribution has exceeded its life-span. |
| | The distribution is considered complete to an endpoint when that endpoint has reached a final state. Intermediate events occur too frequently to send events back to the distribution manager (instead the intermediate event information is stored in the lower level repeaters). Final states send results back to the calling application and final status information to the Distribution Manager. |

TABLE 5

Status Message

| Information | Description |
| --- | --- |
| Distribution ID | Distribution ID |
| Node Status List | List of target statuses. Each member of the Node Status List has the elements in Table 5a. |

TABLE 5a

Node Status List

| Information | Description |
| --- | --- |
| Node ID | Node ID |
| Target State | |
| Start Time | |
| Finish Time | |
| Unavailable Time | Length of time target is unavailable. |
| Receiving Time | Length of time target is receiving. |
| Interrupted Time | Length of time target is interrupted. |
| Interrupted Count | Number of times connection was interrupted. |

TABLE 6

Control Message

| Information | Description |
| --- | --- |
| Distribution ID | Distribution ID |
| Control Type | Type of control message, eg. Pause, Resume, Cancel |
| Route Tree | Path used to send control message. Leaf nodes are targets (or endpoints) and intermediate nodes are repeaters |

TABLE 7

Exceptions

| Exceptions | Description |
| --- | --- |
| No exception thrown | Distribution was received and successfully processed |
| Application Error | Distribution was received, but the application was unable to correctly process the distribution |
| Distribution Error | Distribution was not properly received |
| Disk Full | Not enough disk space to receive and process this distribution |
| Out of Memory | Out of Memory |
| Canceled | Distribution is being canceled. |
| Paused | Distribution was paused Repeater |

What is claimed is:

1. A method of monitoring data distribution progress in a computer network including a distribution manager and an end-user terminal communicating with the distribution manager through at least one node in the network, the method comprising the steps of:

generating an identifier associated with the distribution and a routing to the end-user terminal through the network with the distribution manager;

updating a distribution state table with the distribution manager, the distribution state table maintaining information describing progress of the distribution;

updating a node state table with the distribution manager, the node state table maintaining information describing a status of the node in the network;

transmitting distribution data to the end-user terminal via the selected routing;

collecting data at the node from the end-user terminal describing the status of the end-user terminal;

transmitting the data collected at the node to the distribution manager; and updating the distribution state and node state tables with the data received from the node.

2. The method of claim 1 and further comprising the step of generating a user display using information maintained in the distribution state and node state tables.

3. The method of claim 1 and further comprising the step of maintaining intermediate status data describing a state of the end-user terminal at the node.

4. The method of claim 1 and further comprising the step of initiating the distribution, said step comprising the sub-step of transmitting a description of the distribution and a list of end-user terminals from the node to the distribution manager.

5. The method of claim 1 and further comprising the steps of:

processing the distribution data at the end-user terminal to generate results; and passing the results to a calling application through the node.

6. A method of monitoring data distribution in a network including a server running a distribution manager, a source repeater communicating with the server, a second repeater communicating with the source repeater, and a plurality of target machines communicating with the second repeater, the method comprising the steps of:

initiating a distribution with an application associated with the source repeater;

in response to said step of initiating, generating an identifier for the distribution with the distribution manager;

generating a distribution table in the database with the distribution manager corresponding to the identifier, the distribution table storing global status data for the distribution;

generating an endpoint table in the database with the distribution manager corresponding to the identifier for each of the repeaters and target machines in the network, the endpoint tables storing status data for each repeater and target machine;

transmitting distribution data from the source repeater to the target machines via the second repeater;

generating final status data at each target machine;

collecting the final status data with the second repeater;

transmitting the collected status data from the second repeater to the server via the source repeater; and updating the distribution and endpoint tables in the database with the distribution manager.

7. The method of claim 6 and further comprising the step of generating a user display using data in the distribution and endpoint tables in the database.

8. The method of claim 7 wherein the user display comprises a graphics user interface generated at a terminal coupled to the server.

9. The method of claim 6 and further comprising the step of collecting intermediate status information generated by selected ones of the endpoints with the second repeater.

10. The method of claim 6 wherein said step of collecting final status data with the second repeater comprises the step of collecting final status data until final status data has been received from each of the target machines.

11. The method of claim 6 wherein said step of collecting final status data with the second repeater comprises the step of collecting final status data until a predetermined time period expires.

12. The method of claim 6 and further comprising the steps of:

processing the distribution data within the target processors to generate results; and returning the results to the application through the second and source repeaters.

13. The method of claim 6 wherein the second repeater comprises a gateway repeater.

14. A computer network comprising:

a server for running a distribution manager, the distribution manager operable to generate tables within a database for storing information describing progress of a data distribution;

a plurality of target machines for receiving distribution data from a source within said network and generating status data in response; and a repeater operable to effectuate the exchange of status data between said target machines and said distribution manager for updating said tables in said database.

15. The computer network of claim 14 wherein said tables comprise a table maintaining data describing an global status of a distribution and tables maintaining data describing status of each target machine in the network during the distribution.

16. The computer network of claim 14 wherein each of said target machines generates status information when said target machine enters or exits a state selected from the group consisting of pause, unavailable and interrupted.

17. The computer network of claim 14 wherein each of said target machines generates status information including an exception message selected from the group consisting of an application error and a distribution error messages.

18. The computer network of claim 14 wherein each of said target machines generates status information including an exception message selected from the group consisting of a disk full and out of memory messages.

19. The computer network of claim 14 wherein said repeater comprises a source repeater.

20. The computer network of claim 14 wherein said repeater comprises a gateway repeater.

21. A computer network comprising:

a server for running a distribution manager for controlling operations in an associated database;

a source repeater coupled to said server and operating in response to an application program, said application program initiating a data distribution;

a plurality of target machines for receiving data during a said distribution and generating status information in response;

a gateway repeater coupled to said plurality of target machines for collecting status information generated by said target machines, said gateway repeater transmitting said status information to said distribution manager for storage in corresponding tables within said database via at least one other repeater comprising said network; and a user interfacing allowing user access to data stored within said tables within said interface.

22. The computer network of claim 21 wherein said at least one other repeater comprises said source repeater.

23. The computer network of claim 21 wherein said user interface comprises a graphics user interface.

* * * * *